United States Patent
Childress et al.

(10) Patent No.: US 7,549,149 B2
(45) Date of Patent: Jun. 16, 2009

(54) AUTOMATIC SOFTWARE DISTRIBUTION AND INSTALLATION IN A MULTI-TIERED COMPUTER NETWORK

(75) Inventors: Rhonda L. Childress, Austin, TX (US); Michael Jason Doney, Charlotte, NC (US); Susan Mary Guy, Concord, NC (US); Timidthy Sanford McKnight, Huntersville, NC (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 10/645,198

(22) Filed: Aug. 21, 2003

(65) Prior Publication Data

US 2005/0044545 A1 Feb. 24, 2005

(51) Int. Cl.
 *G06F 9/445* (2006.01)
(52) U.S. Cl. .............. 717/177; 717/174; 717/175; 717/178; 719/316; 709/223; 709/224
(58) Field of Classification Search ......... 717/166–178; 709/249, 223, 229
 See application file for complete search history.

(56) References Cited

U.S. PATENT DOCUMENTS

| | | | | |
|---|---|---|---|---|
| 5,694,123 | A | 12/1997 | Selker et al. | 341/22 |
| 6,084,576 | A | 7/2000 | Leu et al. | 345/168 |
| 6,106,564 | A | 8/2000 | Chen | 703/21 |
| 6,189,038 | B1 | 2/2001 | Thompson et al. | 709/231 |
| 6,253,254 | B1 | 6/2001 | Erlenkoetter et al. | 709/316 |
| 6,366,954 | B1 | 4/2002 | Traversat et al. | 709/220 |
| 6,466,898 | B1 * | 10/2002 | Chan | 703/17 |
| 6,476,833 | B1 * | 11/2002 | Moshfeghi | 715/854 |
| 6,601,034 | B1 * | 7/2003 | Honarvar et al. | 705/7 |
| 6,615,258 | B1 * | 9/2003 | Barry et al. | 709/223 |
| 6,618,764 | B1 * | 9/2003 | Shteyn | 709/249 |
| 6,629,081 | B1 * | 9/2003 | Cornelius et al. | 705/30 |
| 6,868,448 | B1 * | 3/2005 | Gupta et al. | 709/226 |
| 6,934,709 | B2 * | 8/2005 | Tewksbary | 707/10 |
| 6,941,376 | B2 * | 9/2005 | Mitchell et al. | 709/229 |

(Continued)

OTHER PUBLICATIONS

Focus on HP OpenView, Nathan J. Muller, Mar. 1995, Whole book.*

(Continued)

*Primary Examiner*—Lewis A Bullock, Jr.
*Assistant Examiner*—Michael Yaary
(74) *Attorney, Agent, or Firm*—Yee & Associates, P.C.; William H. Steinberg (57) ABSTRACT

A system, method, and computer program product are disclosed for providing automatic software distribution and installation throughout a multi-tiered computer architecture. The multi-tiered architecture includes a global tier, a hub tier below the global tier, and a target tier that is below the hub tier. A distribution request is received within a global computer system that is in the global tier. The distribution request is to distribute a file package to a target computer system that is in the target tier. The global computer system starts a distribution process in the hub computer system. The file package and an installation process are transferred to the hub computer system from the global computer system. The file package and installation process are automatically distributed to the target computer system from the hub computer system utilizing the distribution process. The target computer system then automatically installs the file package utilizing the installation process.

33 Claims, 7 Drawing Sheets

U.S. PATENT DOCUMENTS

| | | | | |
|---|---|---|---|---|
| 6,957,229 | B1* | 10/2005 | Dyor | 707/103 X |
| 7,020,697 | B1* | 3/2006 | Goodman et al. | 709/223 |
| 7,069,234 | B1* | 6/2006 | Cornelius et al. | 705/26 |
| 7,085,822 | B1* | 8/2006 | Donatelli et al. | 709/220 |
| 7,200,144 | B2* | 4/2007 | Terrell et al. | 370/389 |
| 7,206,805 | B1 | 4/2007 | McLaughlin, Jr. | |
| 7,206,844 | B2* | 4/2007 | Gupta et al. | 709/226 |
| 2002/0174207 | A1 | 11/2002 | Battou | |

OTHER PUBLICATIONS

IBM Component Broker on System/390, Alex Gregor et al, Nov. 1998, Whole book.*

Messaging 7 Queuing Using the MQI, Burnie Blakely et al, 1995, Whole Book.*

Developing Applications for Component Broker on OS/390, IBM Redbooks, Alex Louwe Kooilimans et al, Dec. 2000, Whole Manual.*

R. Shevchenko, et al. "Techniques for Increasing Performance of CORBA Parrallel Distributed Applications", Springer Berlin 2001, vol. 2127/2001, pp. 319-328.*

OMG, The Common Object Request Broker: Architecture and Specification, Revision 2.0, Jul. 1996, whole manual.*

IBM, IBM Component Broker on System/390, Nov. 1998, Whole Manual.*

IBM, IBM WebSphere Aplication Server Enterprise Edition Component Broker 3.0: First Step, RedBooks, Aug. 2000, Whole Manual.*

Shevchenko et al., "Techniques for Increasing Performance of of CORBA Parallel distributed Applications", PaCT 2001, LNCS 2127 Springer Berlin, 2002, vol. 2127/2001, pp. 319-328.

U.S. Appl. No. 10/302,523, Childress et al., Method, System, and Computer Program Product for Providing a Four-Tier Corba Architecture, Nov. 21, 2002.

* cited by examiner

AUTOMATIC SOFTWARE DISTRIBUTION AND INSTALLATION IN A MULTI-TIERED COMPUTER NETWORK

CROSS REFERENCE TO RELATED APPLICATIONS

The subject matter of the present application is related to copending U.S. application, Ser. No. 10/302,523, entitled METHOD, SYSTEM, AND COMPUTER PROGRAM PRODUCT FOR PROVIDING A FOUR-TIER CORBA ARCHITECTURE, filed Nov. 21, 2002, assigned to the assignee hereof and incorporated herein by reference.

BACKGROUND OF THE INVENTION

1. Technical Field

The present invention relates generally to the field of computer systems, and more specifically to a data processing system, method, and computer program product for providing a method, system, and product for automatic software distribution and installation in a multi-tiered computer network.

2. Description of Related Art

Object-oriented programming (OOP) has emerged as a powerful new programming tool that enables the rapid development and implementation of functionality while permitting the customization and reuse of objects. The Object Management Group (OMG, an international organization for promoting the theory and practice of object-oriented software technology) defines an industry standard architecture for a distributed object computing environment, called the Object Management Architecture (OMA). The OMA provides a conceptual infrastructure upon which all of the OMG's specifications are based.

OMG defines a structure to allow integration of a wide variety of object systems called the Common Object Request Broker Architecture (CORBA). The CORBA model consists of the Object Request Broker (ORB), CORBAservices, CORBAfacilities and Application Objects. These components make up the primary pieces of CORBA.

A CORBA ORB is a particular type of computer system that provides particular capabilities that are defined by the CORBA specification. In order to function as a CORBA ORB, a computer system must comply with the CORBA specification. Computer systems that do not comply with the CORBA specification for being a CORBA ORB are not classified as CORBA ORBs. These computer systems that do not comply with the CORBA specification for being a CORBA ORB, however, may be coupled to the data processing system as clients and/or servers.

A problem may arise in a CORBA environment because the environment is limited by the CORBA specification to being only a three-tier CORBA ORB system. The specification provides for three levels of CORBA ORBs to be coupled together. Other computer systems, such as servers and clients, may also be coupled to one or more of the CORBA ORBs. These other computer systems do not make up a level of the CORBA ORB architecture, however. The specification provides for only three levels of CORBA ORBs, and does not permit four levels of CORBA ORBs coupled together in a network.

Figure 1:
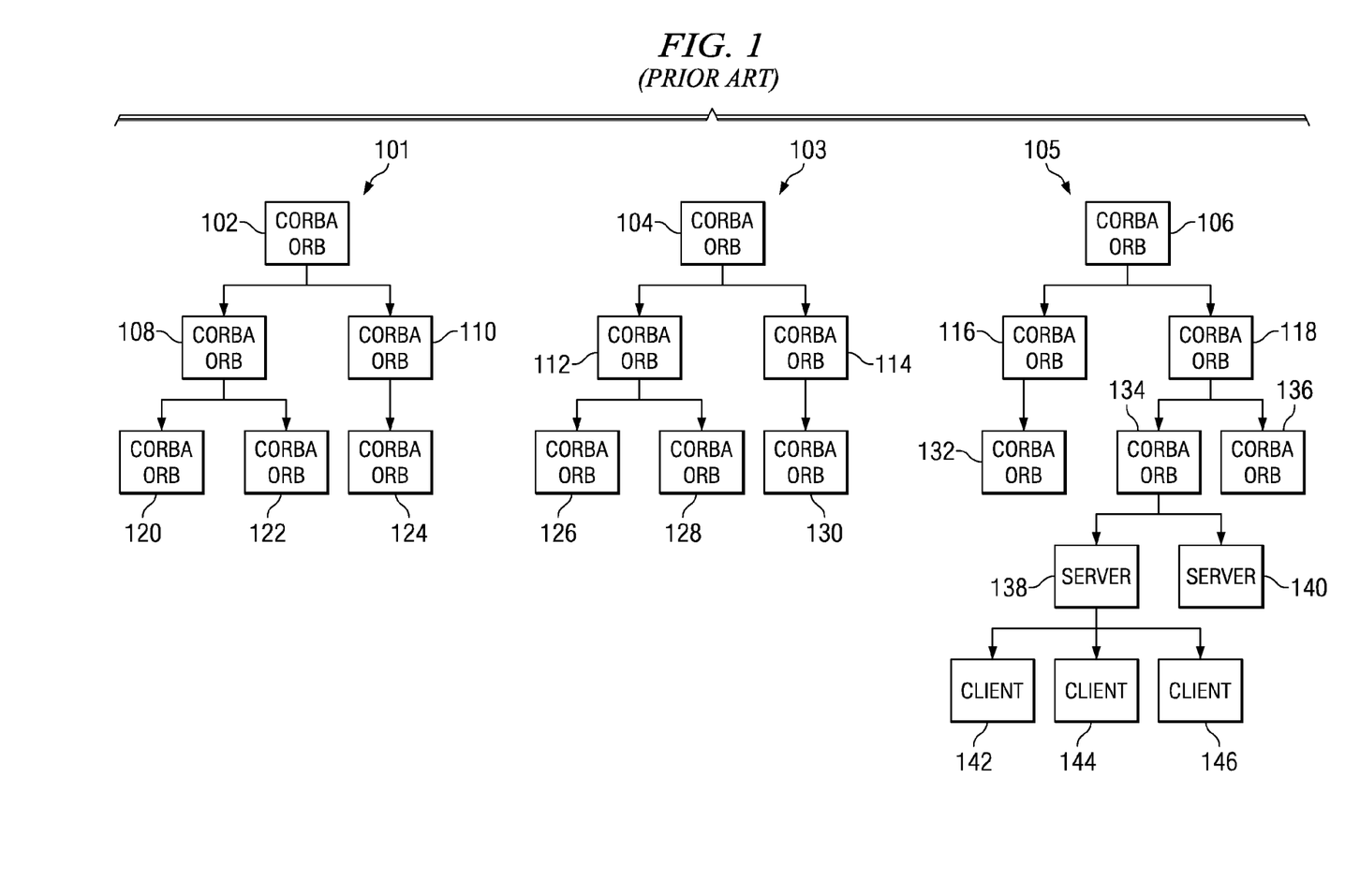
FIG. 1 is a block diagram illustrating a three-tier CORBA architecture in accordance with the prior art.

FIG. 1 is a block diagram illustrating a CORBA data processing system 100 in accordance with the prior art that complies with the CORBA standard. CORBA data processing system 100 includes three separate CORBA networks 101, 103, and 105. The CORBA specification provides for only three tiers of CORBA ORB computer systems. Therefore, each network includes only three levels, or tiers, of CORBA ORB computer systems.

CORBA network 101 includes CORBA ORBs 102, 108, 110, 120, 122, and 124. CORBA network 103 includes CORBA ORBs 104, 112, 114, 126, 128, and 130. And, CORBA network 105 includes CORBA ORBs 106, 116, 118, 132, 134, and 136.

CORBA ORBs 102, 104, and 106 all occupy a first level, or tier. CORBA ORBs 108, 110, 112, 114, 116, and 118 all occupy a second level, which is below the first level. CORBA ORBs 120, 122, 124, 126, 128, 130, 132, 134, and 136 all occupy a third level, which is below the second level. Servers and clients may be, and typically are, coupled to one or more of the CORBA ORBs. For example, servers 138 and 140 are coupled to CORBA ORB 134. Clients 142, 144, and 146 are coupled to server 138.

A need exists for a method, system, and computer program product for automatically distributing and installing software packages throughout a multi-tiered computer network, such as a four-tier CORBA architecture.

SUMMARY OF THE INVENTION

A system, method, and computer program product are disclosed for providing automatic software distribution and installation throughout a multi-tiered computer architecture. The multi-tiered architecture includes a global tier, a hub tier below the global tier, and a target tier that is below the hub tier. A distribution request is received within a global computer system that is in the global tier. The distribution request is to distribute a file package to a target computer system that is in the target tier. The global computer system starts a distribution process in the hub computer system. The file package and an installation process are transferred to the hub computer system from the global computer system. The file package and installation process are automatically distributed to the target computer system from the hub computer system utilizing the distribution process. The target computer system then automatically installs the file package utilizing the installation process.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and computer program product for automatically distributing and installing software packages throughout a multi-tiered computer network, such as a four-tier CORBA architecture. The multi-tiered computer network includes a global tier, a hub tier, and a target tier. A global computer system that is located in the global tier manages one or more hub computer systems that are located in the hub tier. Each hub tier manages one or more target computer systems, such as servers and/or clients, that are located in the target tier. Additional tiers may also be included. For example, a spoke tier may be located between the hub tier and a gateway tier. The gateway tier may be located between the spoke tier and the target tier.

In order to efficiently distribute software file packages throughout the computer network, a distribution request may be sent to the global computer system. The distribution request includes a file package block that includes one or more file package requests. Each file package request is a request to either install or remove a particular software file package. In addition, the file package block will also include software file packages that are to be installed as well as scripts that can be used to install the file packages. The distribution request also includes an identification of all computer systems on which the file packages are to be installed.

The global computer system executes a distribution and a notification script that receives distribution requests. A queue is included within the global computer system for storing distribution requests. Requests in the queue are processed in the order received. The global computer system reads the next request from the queue, and prepares the hub computer systems to process the distribution request. The global computer system checks each hub to make sure it is available, and if it is available, locks the hub using a unique request identifier that has been assigned to the distribution request. The hub queues all other requests while it is locked and is thus prevented from processing other requests while it is locked.

The global computer system generates an initialization file that will include information for each hub to use to distribute the software file packages. The global computer system sends the initialization file and the file block package to each hub computer system that is specified to distribute the file packages. The global computer system then causes the hub to start executing a hub distribution script within the hub.

Error handling will occur during the distribution of the distribution request to the hub. When a non-fatal error occurs during the distribution of a distribution request, an entry in an error log is generated. The entry will include a description of the error and the request identifier. This distribution request will then be requeued so that another attempt to process it may be made without requiring that the distribution request be resubmitted to the global computer system.

A hub will then be locked and will receive a distribution request from the global computer system. The hub will also receive an installation file and the file package block of file packages and scripts to install the file packages. The hub will be executing a hub distribution script. This hub distribution script will parse the file package block to identify the individual file package requests included in the file package block.

The hub distribution script will first identify any file package requests to remove file packages from target computer systems. The hub distribution script will remove those file packages from the identified targets. These particular file packages are also then removed from the hub. Next, the hub distribution script will identify file package requests to install file packages on particular targets. For installation types of file package requests, a copy of the particular file package and an installation script are also included in the file package block. The hub distribution script will then use a script from the file package block to distribute the file package to the target and then cause the target computer system to install the file package using the installation script.

Similarly to the distribution by the global computer system, error handling will occur during the distribution of file package requests from the hub to the target(s). When a non-fatal error occurs during the distribution of file package requests from the hub to the target(s), an entry in an error log is generated. The entry will include a description of the error and the request identifier. The distribution of file package requests will then be requeued so that another attempt to process them may be made.

Each target computer system will receive individual file packages from the hub and installation scripts. Each target will then install each file package on the target using the file package's installation script.

Error handling will occur during the receipt and installation the individual file package requests within the target. When a non-fatal error occurs during the receipt and/or installation of a file package request, an entry in an error log is generated. The entry will include a description of the error and the request identifier. The distribution request will then be requeued so that another attempt to process it may be made so that another attempt to process it may be made without requiring that the distribution request be resubmitted to the global computer system.

The present invention provides three different methods for initiating a distribution. The distribution may be completely automatic within the computer network by starting the distribution via an email message. An email message may be sent to the global computer system that includes a distribution request. A mail script executing within the global system will retrieve the email, create a request identifier for the distribution request, and forward the distribution request and request identifier to the distribution and notification script executing within the global computer system for processing.

A user may initiate a distribution via a web browser by completing a distribution request form. The web browser will then assign a unique request identifier to the request and forward the distribution request and request identifier to the distribution and notification script executing within the global computer system for processing.

A user may initiate a distribution via a command line. This method does not generate a request identifier and thus should only be used for debugging purposes.

Figure 2:
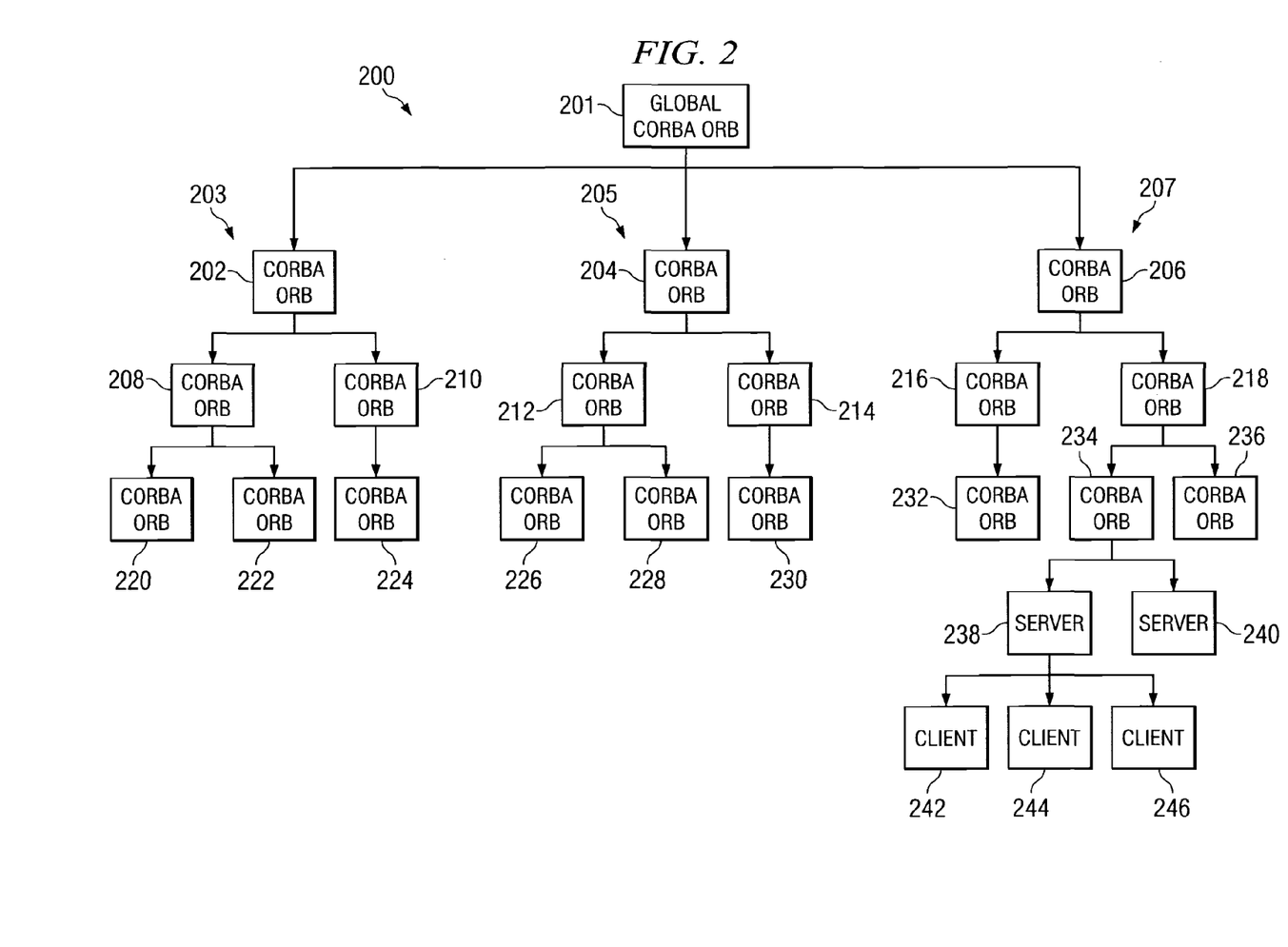
FIG. 2 is a block diagram depicting a four-tier CORBA architecture in accordance with the present invention.

FIG. 2 is a block diagram depicting a four-tier CORBA architecture in accordance with the present invention. CORBA data processing system 200 includes three CORBA three-tier networks 201 coupled together utilizing a fourth-tier Global CORBA ORB 201. In accordance with the present invention, CORBA data processing system 200 includes four tiers of CORBA ORBs. CORBA ORB 201 occupies the top level, also referred to herein as the global level. The global level occupies the level above the first level in the hierarchy.

CORBA network 203 includes CORBA ORBs 202, 208, 210, 220, 222, and 224. CORBA network 205 includes CORBA ORBs 204, 212, 214, 226, 228, and 230. And, CORBA network 207 includes CORBA ORBs 206, 216, 218, 232, 234, and 236.

CORBA ORBs 202, 204, and 206 all occupy a first level. The first level is below the global level in the four-tier hierarchy. CORBA ORBs 208, 210, 212, 214, 216, and 218 all occupy a second level, which is below the first level. CORBA ORBs 220, 222, 224, 226, 228, 230, 232, 234, and 236 all occupy a third level, which is below the second level. Servers and clients may be, and typically are, coupled to one or more of the CORBA ORBs. For example, servers 238 and 240 are coupled to CORBA ORB 234. Clients 242, 244, and 246 are coupled to server 238.

Thus, the CORBA architecture depicted FIG. 2 is a four-tier architecture that includes a global level, and first, second, and third levels. The global level is the top level in the hierarchy and is above the first level.

Figure 3:
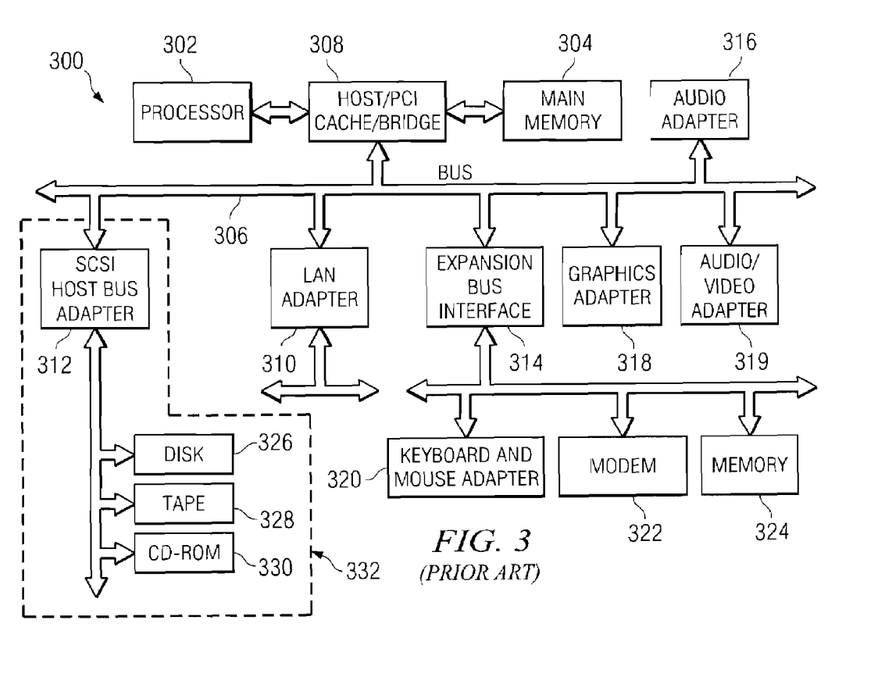
FIG. 3 is a block diagram illustrating a data processing system that may be utilized to implement a server, client, object request broker, or any other computer system in accordance with the present invention.

FIG. 3 is a block diagram illustrating a data processing system that may be utilized to implement a server, client, object request broker, or any other computer system in accordance with the present invention. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, network card 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
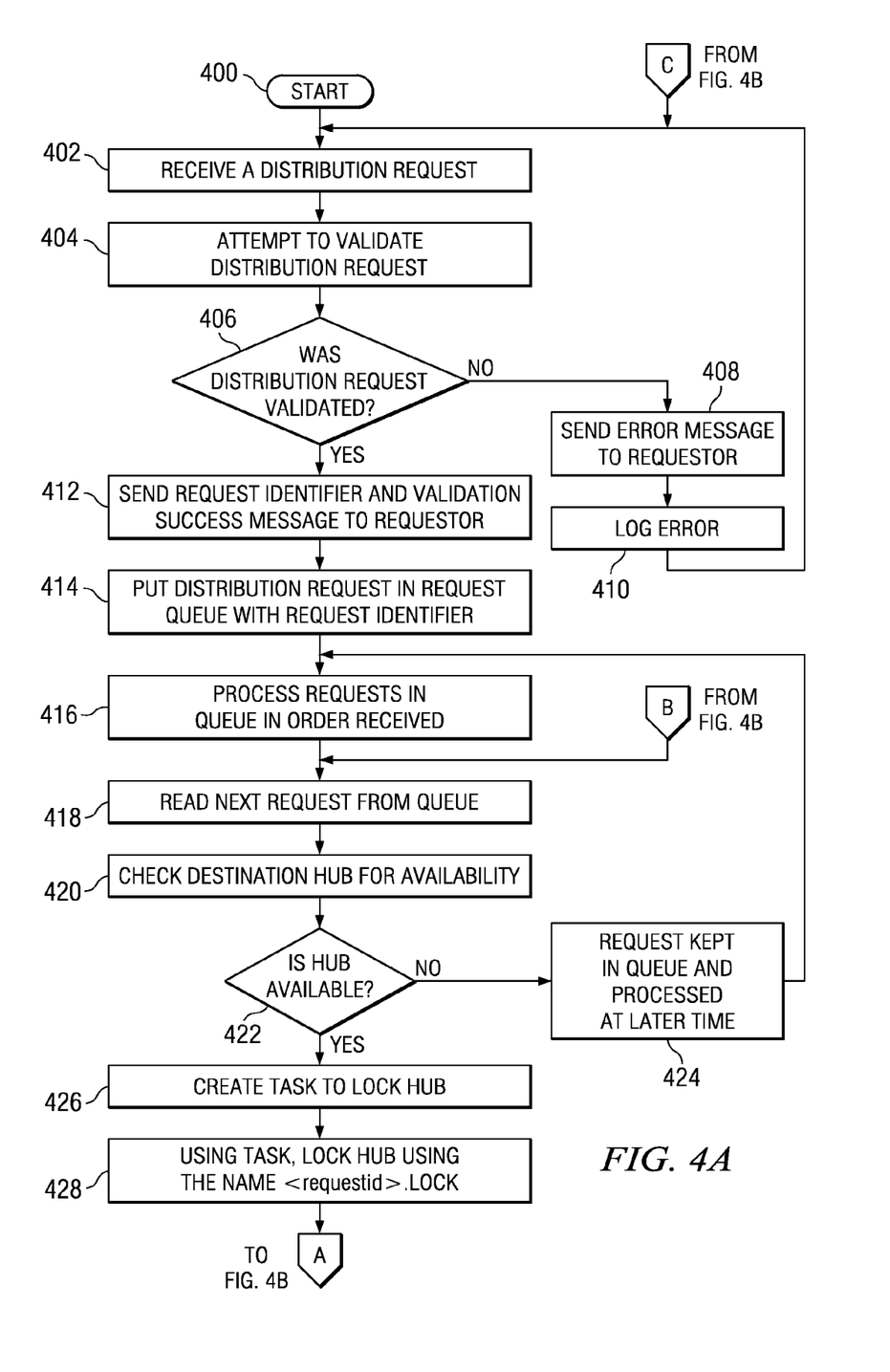
FIGS. 4A-4B together illustrate a high level flow chart which depicts a distribution and notification process for automatically distributing software packages from global tier computer systems to hub tier computer systems in accordance with the present invention.
Figure 4B:
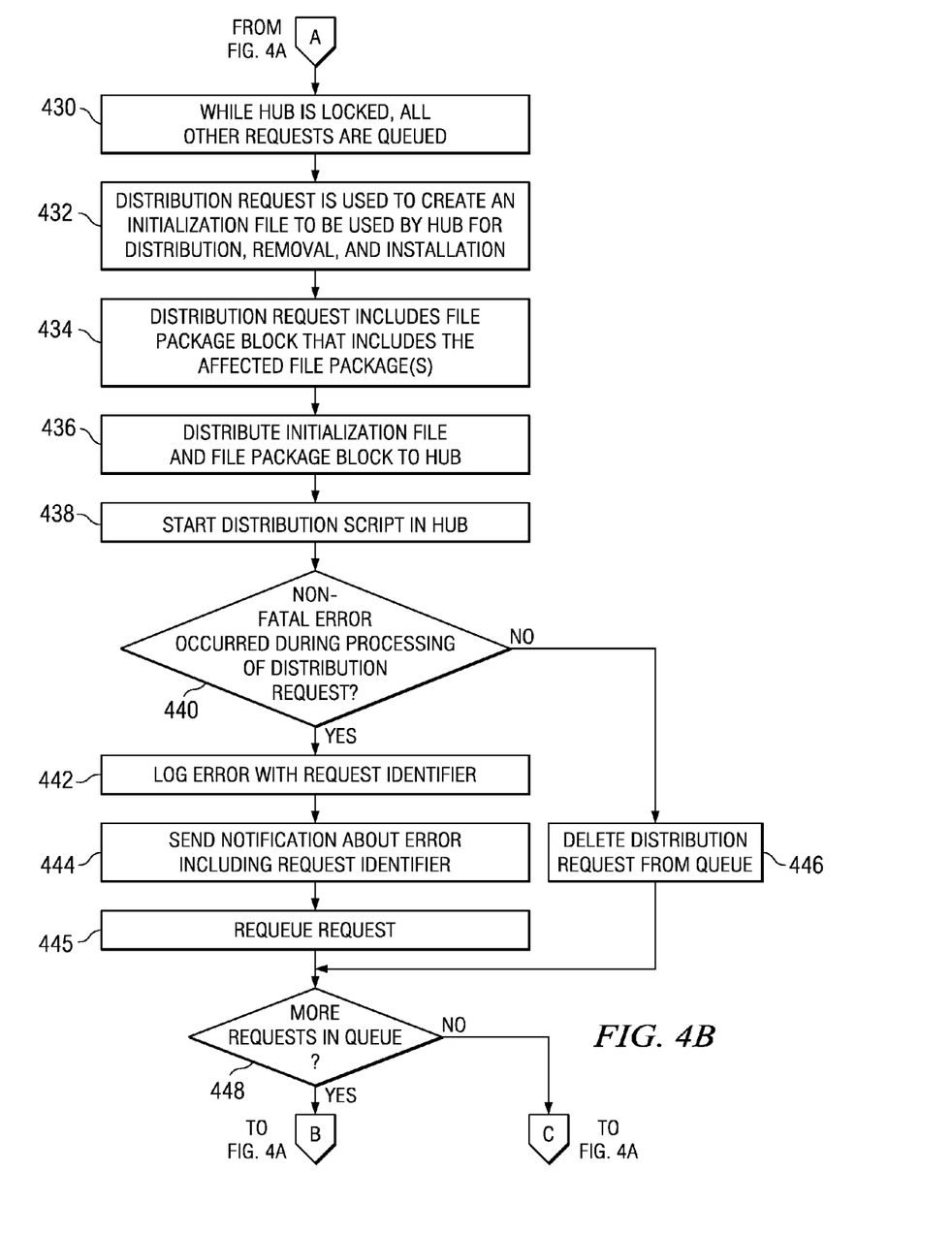

FIGS. 4A-4B together illustrate a high level flow chart which depicts a distribution and notification process for automatically distributing software packages from global tier computer systems to hub tier computer systems in accordance with the present invention. The process starts as depicted by block 400 and thereafter passes to block 402 which illustrates receiving a distribution request. Next, block 404 depicts attempting to validate the distribution request.

Block 406, then, illustrates a determination of whether or not the distribution request was validated. If a determination is made that the distribution request was not validated, the process passes to block 408 which depicts sending an error message to the requester. Thereafter, block 410 illustrates logging the error. The process then passes back to block 402.

Referring again to block 406, if a determination is made that the distribution request was validated, the process passes to block 412 which depicts sending the request identifier and a validation success message to the requester. The process then passes to block 414 which illustrates putting the distribution request in a queue within the hub along with the request's unique request identifier. Next, block 416 depicts processing requests in the queue in the order that they were received.

The process then passes to block 418 which illustrates reading the next request from the queue. Thereafter, block 420 depicts checking the destination hub for availability. Block 422, then, illustrates a determination of whether or not the hub is available. If a determination is made that the hub is not available, the process passes to block 424 which depicts the request being kept in the queue and being processed at a later time. The process then passes back to block 416.

Referring again to block 422, if a determination is made that the hub is available, the process passes to block 426 which illustrates creating a task to lock the hub. Next, block 428 depicts locking the hub with the name <requestid>.lock using the task. The name <requestid>.lock includes the request identifier. The process then passes to block 430 as illustrated through block 430.

Block 430, then, depicts all other requests being queued while the hub is locked. Thus, the hub is prohibited from processing other requests while the distribution request is being processed. The process then passes to block 432 which illustrates the distribution request being used to create an initialization file to be used by the hub to distribute, remove, and/or install one or more file packages. Next, block 434 depicts the distribution request including a file package block that includes the file packages requests. Thereafter, block 436 illustrates the distribution file and the file package block being distributed to the hub. The process then passes to block 438 which depicts starting a distribution script in the hub which will be responsible for automatically distributing the file packages.

Next, block 440 illustrates a determination of whether or not a nonfatal error has occurred during the processing of the distribution request. If a determination is made that a nonfatal error has occurred, the process passes to block 442 which depicts logging the error with the request identifier. Thereafter, block 444 illustrates sending a notification about the error including the request identifier. Next, block 445 depicts re-queueing this request by placing it back in the queue. In this manner, another attempt may be made by the global computer system to process the distribution request without requiring that the distribution request be resubmitted to the global computer system. The process then passes to block 448.

Referring again to block 440, if a determination is made that no errors occurred, the process passes to block 446 which depicts deleting the distribution request from the queue. Next, block 448 illustrates a determination of whether or not there are more distribution requests in the queue. If a determination is made that there are more distribution requests in the queue, the process passes back to block 418 as depicted through connector B. Referring again to block 448, if a determination is made that there are no more distribution requests in the queue, the process passes back to block 418.

Figure 5:
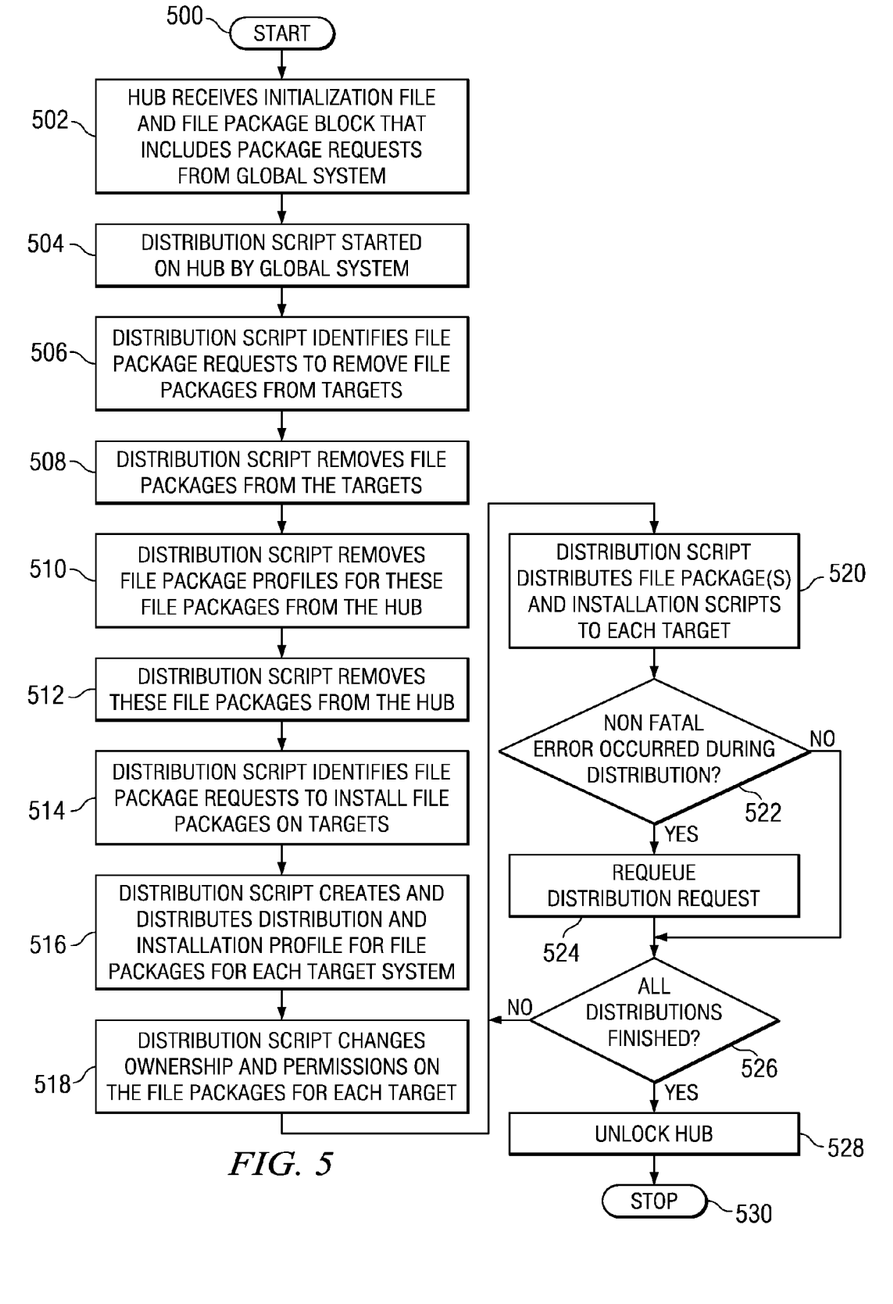
FIG. 5 depicts a high level flow chart which illustrates a distribution and notification process for automatically distributing software packages from hub tier computer systems to target computer systems in accordance with the present invention.

FIG. 5 depicts a high level flow chart which illustrates a distribution and notification process for automatically distributing software packages from hub tier computer systems to target computer systems in accordance with the present invention. The process starts as depicted by block 500 and thereafter passes to block 502 which illustrates a hub receiving an initialization file and a file package block, fpblock, from a global computer system. The file package block includes file package requests, file packages, and scripts that are used to install the file packages.

Next, block 504 depicts the distribution script being started on the hub computer system by the global computer system. Thereafter, block 506 illustrates the distribution script identifying within the distribution request the file package requests to remove file packages from one or more target computer systems. The process then passes to block 508 which depicts the distribution script removing the file packages from the targets as specified by the removal package requests.

Block 510, then, illustrates the distribution script removing the file package profiles for these file packages from the hub. Next, block 512 depicts the distribution script removing these file packages from the hub. Thereafter, block 514 illustrates the distribution script identifying the file package requests to install file packages on one or more target computer systems. The process then passes to block 516 which depicts the distribution script creating and distributing a distribution and installation profile for the file packages for each target computer system.

Next, block 518 illustrates the distribution script changing ownership and permissions on the file packages for each target computer system. Thereafter, block 520 depicts the distribution script distributing the file packages and installation scripts to each target computer system. Block 522, then, illustrates a determination of whether or not a nonfatal error occurred while executing the distribution request and distributing the file packages. If a determination is made that a nonfatal error did not occur, the process passes to block 526. Referring again to block 522, if a determination is made that a nonfatal error did occur, the process passes to block 524 which depicts re-queueing the request to make another attempt to process the request. The process then passes to block 526.

Block 526, then, illustrates a determination of whether or not all distributions specified by this distribution request have finished processing. If a determination is made that the distributions have not finished processing, the process passes back to block 520. Referring again to block 526, if a determination is made that that all required distributions have finished processing, the process passes to block 528 which depicts unlocking the hub. The process then terminates as illustrated by block 530.

Figure 6:
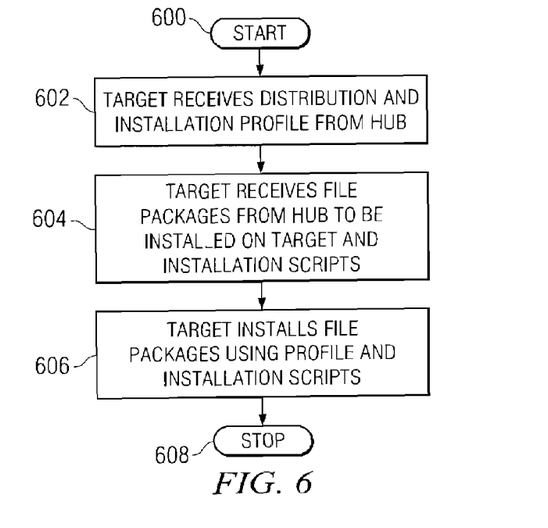
FIG. 6 illustrates a high level flow chart which depicts a target system automatically receiving and installing software packages in accordance with the present invention.

FIG. 6 illustrates a high level flow chart which depicts a target system automatically receiving and installing software packages in accordance with the present invention. The process starts as depicted by block 600 and thereafter passes to block 602 which illustrates a target computer system receiving a distribution and installation profile from the hub. Next, block 604 depicts the target computer system receiving file packages from the hub that are to be installed on the target. The target also receives installation scripts from the hub that will automatically install the file packages when the installation scripts are executed. Block 606, then, illustrates the target computer system executing the installation scripts and installing the file packages. The process then terminates as depicted by block 608.

Figure 7:
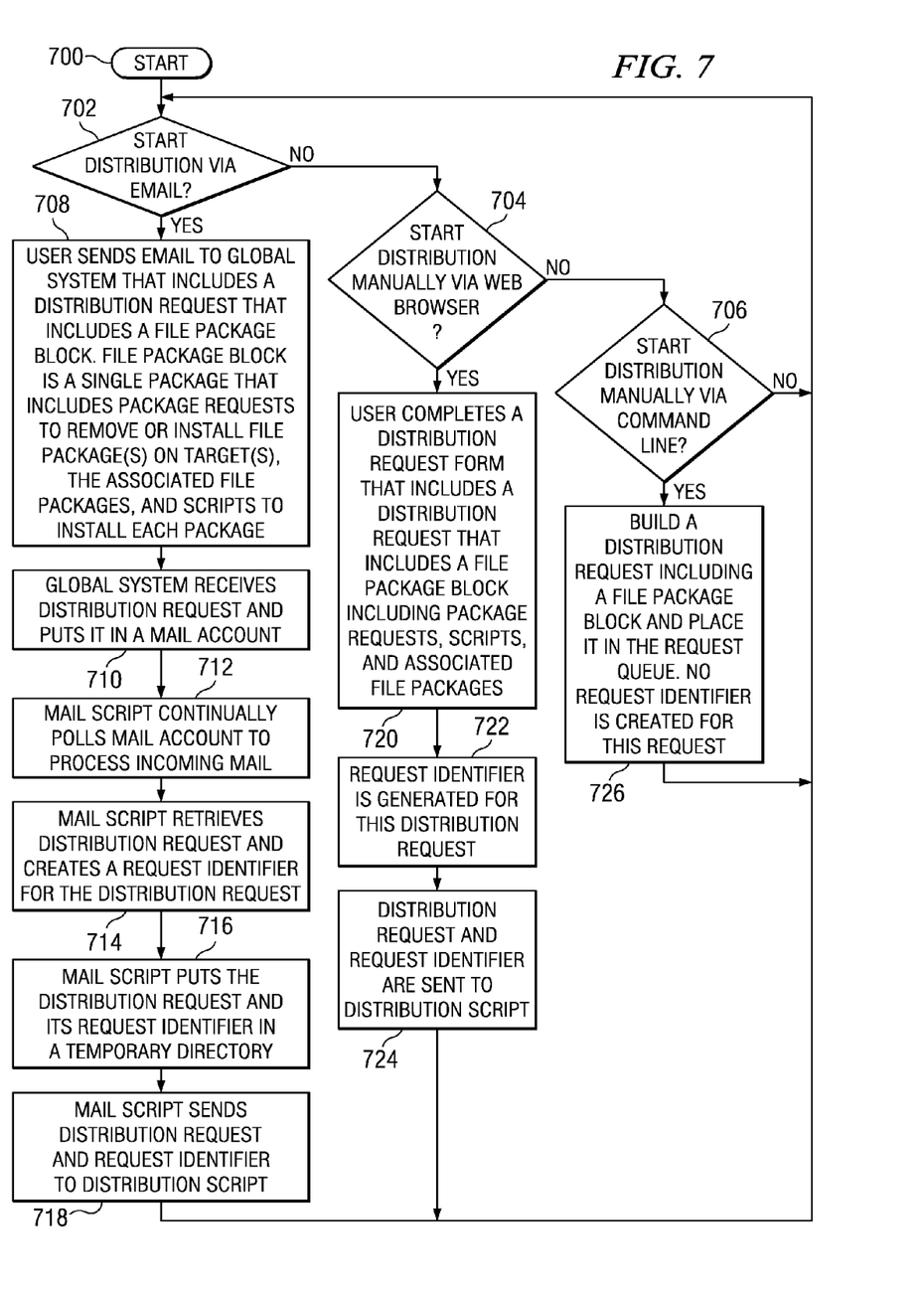
FIG. 7 depicts a high level flow chart which illustrates methods for receiving a distribution request in accordance with the present invention.

FIG. 7 depicts a high level flow chart which illustrates methods for receiving a distribution request in accordance with the present invention. The process starts as depicted by block 700 and thereafter passes to block 702 which illustrates a determination of whether or not a distribution will be started via email. Distributing file packages may be accomplished entirely automatically when the distribution request is generated via email. For example, a user may email a distribution request to the global computer system. Thereafter, if there are no fatal errors during the distribution process, the user is not required to perform any other action in order to get the file packages distributed.

Referring to block 702, if a determination is made that a distribution will be started via email, the process then passes to block 708. Block 708 depicts a user sending an email to the global system. The email includes a distribution request that includes a file package block. The file package block is a single package that includes one or more file package requests, one or more file packages, and installation scripts. The file package requests may either request the removal of an existing file package from a target system, or the distribution and installation of a file package within a target system.

The process then passes to block 710 which illustrates the global system receiving a distribution request and putting that distribution request into a mail account. Next, block 712 depicts a mail script continually polling the mail account to process incoming mail. Thereafter, block 714 illustrates the mail script retrieving the distribution request and creating a request identifier for the distribution request. The process then passes to block 716 which depicts the mail script putting the distribution request and its request identifier in a temporary directory. Next, block 718 illustrates the mail script sending the distribution request and the request identifier to the distribution script. The process then passes to block 702.

Referring again to block 702, if a determination is made that a distribution will not be started via email, the process passes to block 704 which depicts a determination of whether or not a distribution will be started via a web browser. If a determination is made that a distribution will be started via a web browser, the process passes to block 720 which illustrates a user completing a distribution request form. A distribution request is generated using the form. The distribution request includes a file package block including file package requests, scripts, and associated file packages. The process then passes to block 722 which depicts a request identifier being generated for this distribution request. Next, block 724 illustrates the distribution request and request identifier being sent to the distribution request. The process then passes back to block 702.

Referring again to block 704, if a determination is made that a distribution will not be started using a web browser, the process passes to block 706 which depicts a determination of whether or not a distribution will be started manually from a command line. If a determination is made that a distribution request will not be started from a command line, the process back to block 702. Referring again to block 706, if a determination is made that a distribution will be started from a command line, the process passes to block 726 which illustrates building a distribution request from a command line. The distribution request includes a file package block. The distribution request is placed in the request queue. No request identifier is created for this distribution request.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for automatically distributing and installing software file packages throughout a multi-tiered computer architecture CORBA hierarchy, said hierarchy including a four-tier CORBA network that includes a global tier functioning as a CORBA ORB, a hub tier that is functioning as a CORBA ORB that is below said global tier, a target tier that is functioning as a CORBA ORB that is below said hub tier, and a gateway tier that is functioning as a CORBA ORB between the hub tier and the target tier, said method comprising the steps of:

receiving, within a global computer system that is located in said global tier, a distribution request to distribute a file package to a target system that is located in said target tier;

starting, by said global computer system, a distribution process in a hub computer system that is located in said hub tier;

distributing said file package and installation process from said global computer system to said hub computer system that is located in said hub tier;

automatically distributing said file package and said installation process to said target computer system from said hub computer system utilizing said distribution process; and automatically installing, by said target computer system, said file package utilizing said installation process.

2. The method according to claim 1, further comprising the steps of:

providing a three-tier CORBA network, said CORBA network including a hub CORBA ORB coupled to a second spoke CORBA ORB, and said spoke CORBA ORB being coupled to a gateway CORBA ORB, wherein said hub CORBA ORB occupies said hub tier of said architecture, said spoke CORBA ORB occupies a spoke tier of said architecture, said spoke tier between said hub tier and a gateway tier, and said gateway CORBA ORB occupies said gateway tier, said gateway tier being located between said gateway tier and said target tier; and coupling said global computer system to said three-tier CORBA network, said global computer system occupies a top tier of said architecture over said first tier, said global computer system functioning as a CORBA ORB and treating said hub CORBA ORB as a managed node.

3. The method according to claim 1, further comprising the steps of:

assigning a unique request identifier to said distribution request; and tracking processing of said distribution request as it is processed by said global computer system, said hub computer system, and said target computer system using said unique request identifier.

4. The method according to claim 1, further comprising the steps of:

determining by said global computer system whether said distribution of said file package and said installation process from said global computer system to said hub computer system was successful;

in response to a determination that said distribution was unsuccessful, re-attempting said distribution.

5. The method according to claim 1, further comprising the steps of:

including a queue within said global computer system for storing distribution requests;

in response to receiving said distribution request, placing said distribution request in said queue; and processing a next request from said queue utilizing said global computer system.

6. The method according to claim 5, further comprising the steps of:

determining by said global computer system whether said distribution of said file package and said installation process from said global computer system to said hub computer system was successful;

in response to a determination that said distribution was unsuccessful, re-queueing said distribution request by restoring said distribution request in said queue; and said global computer system making another attempt to distribute said distribution request without requiring that said distribution request be resubmitted to said global computer system.

7. The method according to claim 1, further comprising the steps of:

in response to receiving said distribution request within said global computer system, locking, by said global computer system, said hub computer system to prevent said hub computer system from processing other requests while said hub computer system is processing said distribution request.

8. The method according to claim 7, further comprising the steps of:

locking said hub computer system using a unique request identifier that identifies said distribution request.

9. The method according to claim 7, further comprising the steps of:
   determining whether said hub computer system is available prior to said global computer system locking said hub computer system;
   in response to a determination that said hub computer system is unavailable, waiting until said hub computer system becomes available; and
   in response to a determination that said hub computer system is available, locking said hub computer system.

10. The method according to claim 1, further comprising the steps of:
    including a plurality of file package requests within said distribution request, each one of said file package requests being a request to either install a particular file package or remove a particular file package; and
    including in said distribution request an installation script for each one of said file requests that is a request to install a particular file package.

11. The method according to claim 1, further comprising the steps of:
    receiving, within said global computer system that is located in said global tier, a distribution request to distribute a plurality of file package requests to a target computer system that is in said target tier;
    each one of said file package requests being a request to either install a particular file package on said target or to remove a particular file package from said target;
    including in said distribution request an installation script for each one of said file requests that is a request to install a particular file package;
    starting, by said global computer system, a distribution process in said hub computer system;
    distributing said plurality of file packages and an installation process from said global computer system to said hub computer system that is located in said hub tier;
    utilizing said distribution process within said hub to automatically distribute to said target computer system ones of said file package requests that are requests to remove a particular file package from said target computer system;
    automatically removing, by said target computer system, said particular file for each of said ones of said file package requests that are requests to remove a particular file;
    utilizing said distribution process within said hub to automatically distribute to said target computer system ones of said file package requests that are requests to install a particular file package on said target computer system;
    automatically installing, by said target computer system, said particular file for each of said ones of said file package requests that are requests to install a particular file; and
    said removal requests being executed prior to said installation requests.

12. A data processing system for automatically distributing and installing software file packages throughout a multi-tiered computer architecture CORBA hierarchy, said hierarchy including a four-tier CORBA network that includes a global tier functioning as a CORBA ORB, a hub tier that is functioning as a CORBA ORB that is below said global tier, a target tier that is functioning as a CORBA ORB that is below said hub tier, and a gateway tier that is functioning as a CORBA ORB between the hub tier and the target tier, said system comprising:
    a global computer system that is located in said global tier receiving a distribution request to distribute a file package to a target computer system that is located in said target tier;
    said global computer system starting a distribution process in a hub computer system that is located in said hub tier;
    said global computer system distributing said file package and an installation process to said hub computer system that is located in said hub tier;
    said hub computer system utilizing said distribution process to automatically distributing said file package and said installation process to said target computer system; and
    said target computer system automatically installing said file package utilizing said installation process.

13. The system according to claim 12, further comprising:
    a three-tier CORBA network, said CORBA network including a hub CORBA ORB coupled to a second spoke CORBA ORB, and said spoke CORBA ORB being coupled to a gateway CORBA ORB, wherein said hub CORBA ORB occupies said hub tier of said architecture, said spoke CORBA ORB occupies a spoke tier of said architecture, said spoke tier between said hub tier and a gateway tier, and said gateway CORBA ORB occupies said gateway tier, said gateway tier being located between said gateway tier and said target tier; and
    said global computer system coupled to said three-tier CORBA network, said global computer system occupies a top tier of said architecture over said first tier, said global computer system functioning as a CORBA ORB and treating said hub CORBA ORB as a managed node.

14. The system according to claim 12, further comprising:
    a unique request identifier assigned to said distribution request; and
    said unique request identifier for tracking processing of said distribution request as it is processed by said global computer system, said hub computer system, and said target computer system.

15. The system according to claim 12, further comprising:
    said global computer system determining whether said distribution of said file package and said installation process from said global computer system to said hub computer system was successful;
    in response to a determination that said distribution was unsuccessful, said global computer system re-attempting said distribution.

16. The system according to claim 12, further comprising:
    a queue included within said global computer system for storing distribution requests;
    in response to receiving said distribution request, said distribution request being placed in said queue; and
    said global computer system processing a next request from said queue.

17. The system according to claim 16, further comprising:
    said global computer system determining whether said distribution of said file package and said installation process from said global computer system to said hub computer system was successful;
    in response to a determination that said distribution was unsuccessful, said distribution request being re-queueing said distribution request by restoring said distribution request in said queue; and
    said global computer system making another attempt to distribute said distribution request without requiring that said distribution request be resubmitted to said global computer system.

18. The system according to claim 12, further comprising:
in response to receiving said distribution request within said global computer system, said global computer system locking said hub computer system to prevent said hub computer system from processing other requests while said hub computer system is processing said distribution request.

19. The system according to claim 18, further comprising:
said hub computer system being locked using a unique request identifier that identifies said distribution request.

20. The system according to claim 18, further comprising:
said global computer system determining whether said hub computer system is available prior to said global computer system locking said hub computer system;
in response to a determination that said hub computer system is unavailable, said global computer system waiting until said hub computer system becomes available; and
in response to a determination that said hub computer system is available, said global computer system locking said hub computer system.

21. The system according to claim 12, further comprising:
said distribution request including a plurality of file package requests, each one of said file package requests being a request to either install a particular file package or remove a particular file package; and
said distribution request including an installation script for each one of said file requests that is a request to install a particular file package.

22. The system according to claim 12, further comprising:
said global computer system that is located in said global tier receiving a distribution request to distribute a plurality of file package requests to a target computer system that is in said target tier;
each one of said file package requests being a request to either install a particular file package on said target or to remove a particular file package from said target;
said distribution request including an installation script for each one of said file requests that is a request to install a particular file package;
said global computer system starting a distribution process in said hub computer system;
said global computer system distributing said plurality of file packages and an installation process to said hub computer system that is located in said hub tier;
said hub computer system utilizing said distribution process included in said hub computer system to automatically distribute to said target computer system ones of said file package requests that are requests to remove a particular file package from said target computer system;
said target computer system automatically removing said particular file for each of said ones of said file package requests that are requests to remove a particular file;
said hub computer system utilizing said distribution process within said hub computer system to automatically distribute to said target computer system ones of said file package requests that are requests to install a particular file package on said target computer system;
said target computer system automatically installing said particular file for each of said ones of said file package requests that are requests to install a particular file; and
said removal requests being executed prior to said installation requests.

23. A computer program product in a recordable-type medium for automatically distributing and installing software file packages throughout a multi-tiered computer architecture CORBA hierarchy, said hierarchy including a four-tier CORBA network that includes a global tier functioning as a CORBA ORB, a hub tier that is functioning as a CORBA ORB that is below said global tier, a target tier that is functioning as a CORBA ORB that is below said hub tier, and a gateway tier that is functioning as a CORBA ORB between the hub tier and the target tier, said computer program product comprising:
instruction means for receiving, within a global computer system that is located in said global tier, a distribution request to distribute a file package to a target computer system that is located in said target tier;
instruction means for starting, by said global computer system, a distribution process in a hub computer system that is located in said hub tier;
instruction means for distributing said file package and an installation process from said global computer system to said hub computer system that is located in said hub tier;
instruction means for automatically distributing said file package and said installation process to said target computer system from said hub computer system utilizing said distribution process; and
instruction means for automatically installing, by said target computer system, said file package utilizing said installation process.

24. The product according to claim 23, further comprising:
a three-tier CORBA network, said CORBA network including a hub CORBA ORB coupled to a second spoke CORBA ORB, and said spoke CORBA ORB being coupled to a gateway CORBA ORB, wherein said hub CORBA ORB occupies said hub tier of said architecture, said spoke CORBA ORB occupies a spoke tier of said architecture, said spoke tier between said hub tier and a gateway tier, and said gateway CORBA ORB occupies said gateway tier, said gateway tier being located between said gateway tier and said target tier; and
instruction means for coupling said global computer system to said three-tier CORBA network, said global computer system occupies a top tier of said architecture over said first tier, said global computer system functioning as a CORBA ORB and treating said hub CORBA ORB as a managed node.

25. The product according to claim 23, further comprising:
instruction means for assigning a unique request identifier to said distribution request; and
instruction means for tracking processing of said distribution request as it is processed by said global computer system, said hub computer system, and said target computer system using said unique request identifier.

26. The product according to claim 23, further comprising:
instruction means for determining by said global computer system whether said distribution of said file package and said installation process from said global computer system to said hub computer system was successful;
in response to a determination that said distribution was unsuccessful, instruction means for re-attempting said distribution.

27. The product according to claim 23, further comprising:
instruction means for including a queue within said global computer system for storing distribution requests;
in response to receiving said distribution request, instruction means for placing said distribution request in said queue; and
instruction means for processing a next request from said queue utilizing said global computer system.

28. The product according to claim 27, further comprising:
instruction means for determining by said global computer system whether said distribution of said file package and said installation process from said global computer system to said hub computer system was successful;
in response to a determination that said distribution was unsuccessful, instruction means for re-queueing said distribution request by restoring said distribution request in said queue; and
said global computer system making another attempt to distribute said distribution request without requiring that said distribution request be resubmitted to said global computer system.

29. The product according to claim 23, further comprising:
in response to receiving said distribution request within said global computer system, instruction means for locking, by said global computer system, said hub computer system to prevent said hub computer system from processing other requests while said hub computer system is processing said distribution request.

30. The product according to claim 29, further comprising:
instruction means for locking said hub computer system using a unique request identifier that identifies said distribution request.

31. The product according to claim 29, further comprising:
instruction means for determining whether said hub computer system is available prior to said global computer system locking said hub computer system;
in response to a determination that said hub computer system is unavailable, instruction means for waiting until said hub computer system becomes available; and
in response to a determination that said hub computer system is available, instruction means for locking said hub computer system.

32. The product according to claim 23, further comprising:
instruction means for including a plurality of file package requests within said distribution request, each one of said file package requests being a request to either install a particular file package or remove a particular file package; and
instruction means for including in said distribution request an installation script for each one of said file requests that is a request to install a particular file package.

33. The product according to claim 23, further comprising:
instruction means for receiving, within said global computer system that is located in said global tier, a distribution request to distribute a plurality of file package requests to a target computer system that is in said target tier;
each one of said file package requests being a request to either install a particular file package on said target or to remove a particular file package from said target;
instruction means for including in said distribution request an installation script for each one of said file requests that is a request to install a particular file package;
instruction means for starting, by said global computer system, a distribution process in said hub computer system;
instruction means for distributing said plurality of file packages and an installation process from said global computer system to said hub computer system that is located in said hub tier;
instruction means for utilizing said distribution process within said hub to automatically distribute to said target computer system ones of said file package requests that are requests to remove a particular file package from said target computer system;
instruction means for automatically removing, by said target computer system, said particular file for each of said ones of said file package requests that are requests to remove a particular file;
instruction means for utilizing said distribution process within said hub to automatically distribute to said target computer system ones of said file package requests that are requests to install a particular file package on said target computer system;
instruction means for automatically installing, by said target computer system, said particular file for each of said ones of said file package requests that are requests to install a particular file; and
said removal requests being executed prior to said installation requests.

* * * * *